US00RE37916E

(19) United States
(12) Reissued Patent
Szapucki et al.

(10) Patent Number: US RE37,916 E
(45) Date of Reissued Patent: Dec. 3, 2002

(54) SNAP ON LATCH MECHANISM FOR A SASH WINDOW

(75) Inventors: Matthew Peter Szapucki, Toms River, NJ (US); Richard Kulkaski, Forked River, NJ (US)

(73) Assignee: Ashland Products, Inc., Lowell, IN (US)

(21) Appl. No.: 09/408,395

(22) Filed: Sep. 29, 1999

Related U.S. Patent Documents

Reissue of:
(64) Patent No.: 5,671,958
Issued: Sep. 30, 1997
Appl. No.: 08/672,424
Filed: Jun. 28, 1996

(51) Int. Cl.[7] ..... E05C 1/10
(52) U.S. Cl. ..... 292/175; 292/337; 292/DIG. 47
(58) Field of Search ..... 292/175, 337, 292/DIG. 23, DIG. 35, DIG. 47, DIG. 53, 163, 164, 145, 146; 403/329; 49/181, 183, 449

(56) References Cited

U.S. PATENT DOCUMENTS

| | | | | |
|---|---|---|---|---|
| 16,228 A | | 12/1856 | Copeland | |
| 190,074 A | | 4/1877 | Penfield | |
| 194,825 A | | 9/1877 | Judd | |
| 373,107 A | | 11/1887 | Taylor | |
| 1,400,155 A | * | 12/1921 | Greenburg | 70/370 |
| 1,577,053 A | | 3/1926 | Bein | |
| 1,781,729 A | | 11/1930 | Major | |
| 2,143,266 A | * | 1/1939 | Grondahl | 292/342 |
| 2,244,976 A | * | 6/1941 | Tinnerman | 70/370 |
| 2,568,273 A | | 9/1951 | Clark | |
| 2,733,945 A | * | 2/1956 | North | 292/169 |
| 2,768,852 A | | 10/1956 | Hicks | |
| 2,965,935 A | | 12/1960 | Olsen et al. | |
| 3,006,675 A | * | 10/1961 | Erickson | 292/337 |
| 3,046,043 A | | 7/1962 | Matteson | |
| 3,080,621 A | | 3/1963 | Mendelsohn | |
| 3,122,797 A | | 3/1964 | Segre | |
| 3,128,115 A | | 4/1964 | Patriquin et al. | |
| 3,423,276 A | | 1/1969 | Eckenroth | |
| 3,633,248 A | * | 1/1972 | Speedie | 403/329 X |
| 3,724,889 A | | 4/1973 | Dooley | |
| D243,825 S | | 3/1977 | Levin | |
| 4,167,835 A | | 9/1979 | Nobes et al. | |
| 4,320,834 A | * | 3/1982 | Tamaki | 206/404 |
| 4,400,026 A | | 8/1983 | Brown, Jr. | |
| 4,475,311 A | | 10/1984 | Gibson | |
| 4,482,178 A | | 11/1984 | Damiana | |
| 4,553,353 A | | 11/1985 | Simpson | |
| 4,560,602 A | | 12/1985 | Draper | |
| 4,578,903 A | | 4/1986 | Simpson | |
| 4,581,850 A | | 4/1986 | Simpson | |
| 4,587,759 A | | 5/1986 | Gray | |
| 4,622,778 A | | 11/1986 | Simpson | |
| 4,669,765 A | | 6/1987 | Ullman | |
| 4,790,579 A | | 12/1988 | Maxwell et al. | |
| 4,791,756 A | | 12/1988 | Simpson | |
| 4,824,154 A | | 4/1989 | Simpson | |
| 4,837,975 A | | 6/1989 | Simpson | |
| 4,901,475 A | | 2/1990 | Simpson | |
| 4,917,413 A | | 4/1990 | Jason et al. | |
| 5,028,083 A | | 7/1991 | Mischenko | |
| 5,062,671 A | * | 11/1991 | Goetz et al. | 292/175 |

(List continued on next page.)

FOREIGN PATENT DOCUMENTS

| | | | | |
|---|---|---|---|---|
| CA | 966533 | * | 4/1975 | 292/337 |
| WO | 91 05126 | * | 4/1991 | 292/337 |

*Primary Examiner*—Teri Pham Luu
(74) *Attorney, Agent, or Firm*—Wallenstein & Wagner, Ltd.

(57) ABSTRACT

A latch mechanism is described having a housing comprised of a top plate having an aperture, side walls and an end wall depending from the top plate so as to leave a ledge adjacent its periphery, resilient tabs extending outwardly from said side walls and toward said top plate, slots in the side walls parallel to the top plate, a bolt suspended in said housing by wings extending into respective slots and a spring between the end wall of said housing and an end of the bolt.

8 Claims, 6 Drawing Sheets

U.S. PATENT DOCUMENTS 5,068,932 A 12/1991 Chang
5,096,240 A 3/1992 Schultz
5,121,951 A 6/1992 Harbom et al.
5,121,952 A 6/1992 Jason
5,133,581 A 7/1992 Coleman
5,139,291 A 8/1992 Schultz
5,158,329 A * 10/1992 Schlack ..... 292/87
5,165,737 A 11/1992 Riegelman
5,193,707 A * 3/1993 Mizumura ..... 220/326
5,211,432 A * 5/1993 Lin ..... 292/169
5,248,174 A 9/1993 Matz et al.
5,358,291 A * 10/1994 Malmanger et al. ..... 292/175
5,435,159 A * 7/1995 Ramsauer ..... 70/370
5,454,609 A 10/1995 Slocomb et al.
5,536,052 A 7/1996 Maier
5,618,067 A 4/1997 Carlson et al.
5,628,534 A * 5/1997 Morgan ..... 292/128
5,669,639 A 9/1997 Lawrence

* cited by examiner

SNAP ON LATCH MECHANISM FOR A SASH WINDOW

Matter enclosed in heavy brackets [ ] appears in the original patent but forms no part of this reissue specification; matter printed in italics indicates the additions made by reissue.

BACKGROUND OF THE INVENTION

Windows that are hinged on one side of the sash require latch mechanisms at the other to keep them shut. Such mechanisms are generally comprised of an elongated housing containing a bolt that is biased by a spring so that one end extends beyond an end of the housing. That end of the bolt has a biased striking surface that engages one side of a rail in the jamb when the window is almost closed so that further closure forces the bolt back into the housing. When the window is fully closed, the spring forces the bolt outwardly on the other side of the rail to hold it shut. An opening in the housing permits access to the bolt so that the window can be opened by withdrawing it into the housing.

By way of example, such latch mechanisms may be mounted in the outer edges of the top of a top sash member of a window that pivots about an axis through its bottom sash member so that ready access is provided to the outside of the window for cleaning.

When the sash is made of wood, the latch housing may be mounted in a groove that is routed in the tope of the top sash member that extends through the jamb side of the stile on that side and firmly held therein by screws. Firmly mounting a latch mechanism in a hollow sash made of metal or plastic is more difficult. It is customary to form an elongated opening in the top wall of the top sash member that is parallel to that member and that communicates with an opening in the outer wall of the adjacent stile.

In U.S. Pat. No. 5,139,291, a latch mechanism is described that is adapted to be inserted endwise through the opening in the stile and slid along the elongated opening in the top sash member. The edges of the elongated opening serve as rails that slide into grooves formed between a top plate of the housing and ridges along the outsides of walls depending from the top plate. Special notches are required in the sides of the opening in the stile to permit the ridges to pass. The housing is rigid because of a bottom between the edges of the depending walls so as to form a rectilinear opening in which a spring biased bolt slides. A projection from the bottom engages the inside of the stile when the mechanism is installed so as to prevent it from being forced out of the opening in the stile through which it was inserted. Unfortunately, however, there must be play between the rails formed by the edges of the elongated opening in the top of the sash and the grooves in the sides of the housing to permit the housing to be installed as describe so that a firm mounting is not attached. Furthermore, there must be sufficient play to accommodate variation in the dimensions of the elongated opening.

Another latch mechanism that is produced by Ro-Mai Industries of Twinsburg, Ohio is installed by forcing its housing perpendicularly through the elongated opening in the top of the sash. The edges of the elongated opening fit between the top plate of the housing and rigid tabs on its side walls. In order to accommodate top sash walls of different thicknesses and variations in the dimensions of the elongated opening, fairly wide tolerances must be used so that the latch mechanism is not firmly mounted in all cases.

Furthermore, both the Ro-Mai latch mechanism and that of the patent are difficult to assemble so that the spring and bolt are properly positioned because their housings are four sided and rigid.

SUMMARY OF THE INVENTION

A latch mechanism is constructed in accordance with this invention is easy to assemble and can accommodate variations in the thickness of the material from which the sash is made as well as variations in the sizes of the elongated opening in the top of the sash in which they are inserted. Furthermore, special notches are not required in the opening of the stile.

A latch mechanism constructed in accordance with this invention snaps firmly into position when forced perpendicularly through an elongated opening in the top of a top sash that communicates with an opening in the adjacent stile. Its housing is comprised of a top plate that is larger than the elongated opening and a wall having spaced parallel sides and an end depending from the top plate and spaced from its periphery. Resilient tabs extending outwardly from the wall are pushed inwardly as the housing is forced through the elongated opening and snap outwardly when a portion of their tops is below the edge of the opening. The housing is held firmly in position in spite of reasonable variations in the thickness of the edge of the elongated opening and in spite of reasonable variations in its dimensions. Slots that are parallel to the top plate are formed in the sides of the wall.

A bolt of a latch mechanism constructed in accordance with this invention is an elongated member having a base and resilient walls depending therefrom that is adapted to slide between the depending walls of the housing described above with its base adjacent said top plate. The bolt is supported in the housing by wings extending outwardly from the respective resilient walls that are adapted to respectively pass through the slots in the depending walls of the housing. The lower surfaces of the wings slope away from the base so as to draw the walls of the housing toward each other if the base is forced away from the top plate, thus aiding in preventing the bolt from being lost in the hollow sash.

A spring is mounted between the closed end of the housing and the nearer end of the bolt. In the preferred construction, a post extends from the end of the bolt facing the closed end of the housing, and one end of a coiled spring is placed over the post. The other end of the spring bears against the closed end of the housing, and in order to prevent this end of the spring from falling out, the inside of the closed end of the housing is tapered or cup shaped.

In order to aid in accommodating wide tolerances in the thickness of the walls of a sash and in the dimensions of the elongated opening through which the mechanism is inserted, ridges are formed in the tops of the resilient tabs that are perpendicular to the side walls. The ridges make it possible for the tabs to snap outwardly even through the ridges are not entirely below the edges of the elongated opening because it can deform the ridges.

DETAILED DESCRIPTION OF THE INVENTION

Figure 1:
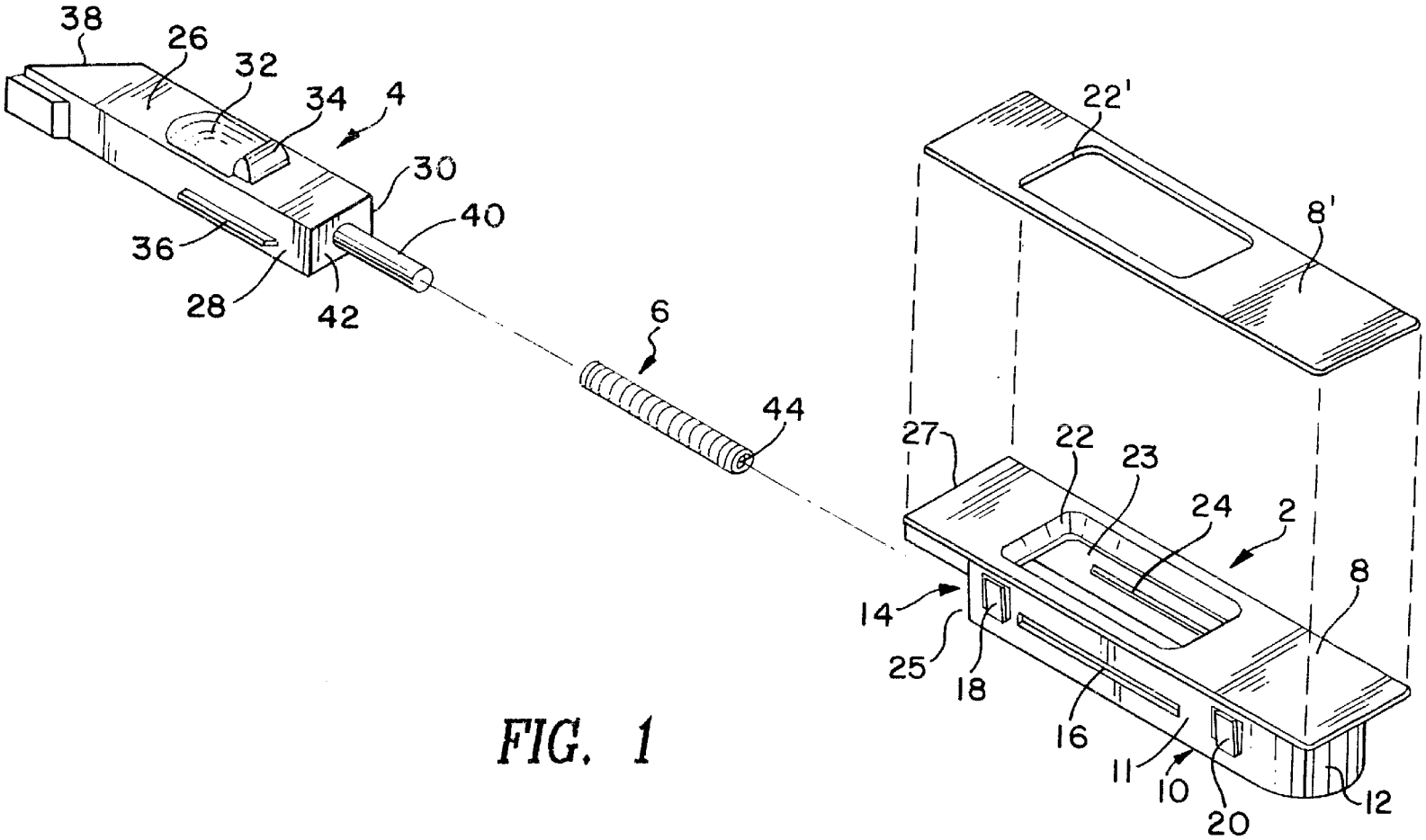
FIG. 1 is an exploded isometric view of a latch mechanism.

FIG. 1 is an exploded isometric view of a latching mechanism of the invention for use in the top left corner of a window that tilts toward the view about the bottom of its sash as viewed from the inside. It will be understood, however, that the latch mechanism may be mounted at different places and that it has other uses. Corresponding components are designated in the same way in all figures of the drawings.

The preferred latching mechanism is comprised of a housing 2, a bolt 4 and a longitudinal coiled compression spring 6. The housing 2 is comprised of a top plate 8 having a wall 10 depending therefrom at a slight distance from its periphery. Only one side wall 11 is seen in this view. One end 12 of the wall 10 is closed, and, although not shown in this view, its other end 14 is open. A slot 16 in the wall 11 is spaced from and runs parallel to the top plate 8, and tabs 18 and 20 that flare outwardly as the approach the top plate 8 are located adjacent opposite ends of the slot 16. An elongated aperture 22 is provided in the top plate 8 through which a slot 24 in a far side wall 23 may be seen. Note that the end 25 of the side wall 11 does not extend to the end 27 of the top plate 8.

The bolt 4 is comprised of an elongated body having a top 26 and two parallel side walls 28 and 30 at right angles to it. A finger well 32 in the top 26 is at one side of an upwardly projecting knob 34, and an elongated wing 36 that is parallel to the top 26 extends from the side wall 28. Although not seen in this view, an identical wing extends from the other side wall 30. One end of the bolt 4 is cut on the bias as indicated at 38 so as to force the bolt to the right along its axis as the window is being shut. A post 40 extends from the other end 42 of the bolt 4 in a direction parallel to the sides 28 and 30 and the top 26. When assembled, the spring 6 fits over the post 40, and the bolt 4 is slid into the open end 14 of the housing 2 until an end 44 of the spring 6 bears against the inside of the closed end 12 of the wall 10.

In a preferred embodiment, a layer 8' of veneer is provided that matches the window sash in appearance and is shaped like the top plate 8 with an aperture 22' like the aperture 22 so that it can be adhered by a suitable adhesive to the top plate 8.

Figure 2:
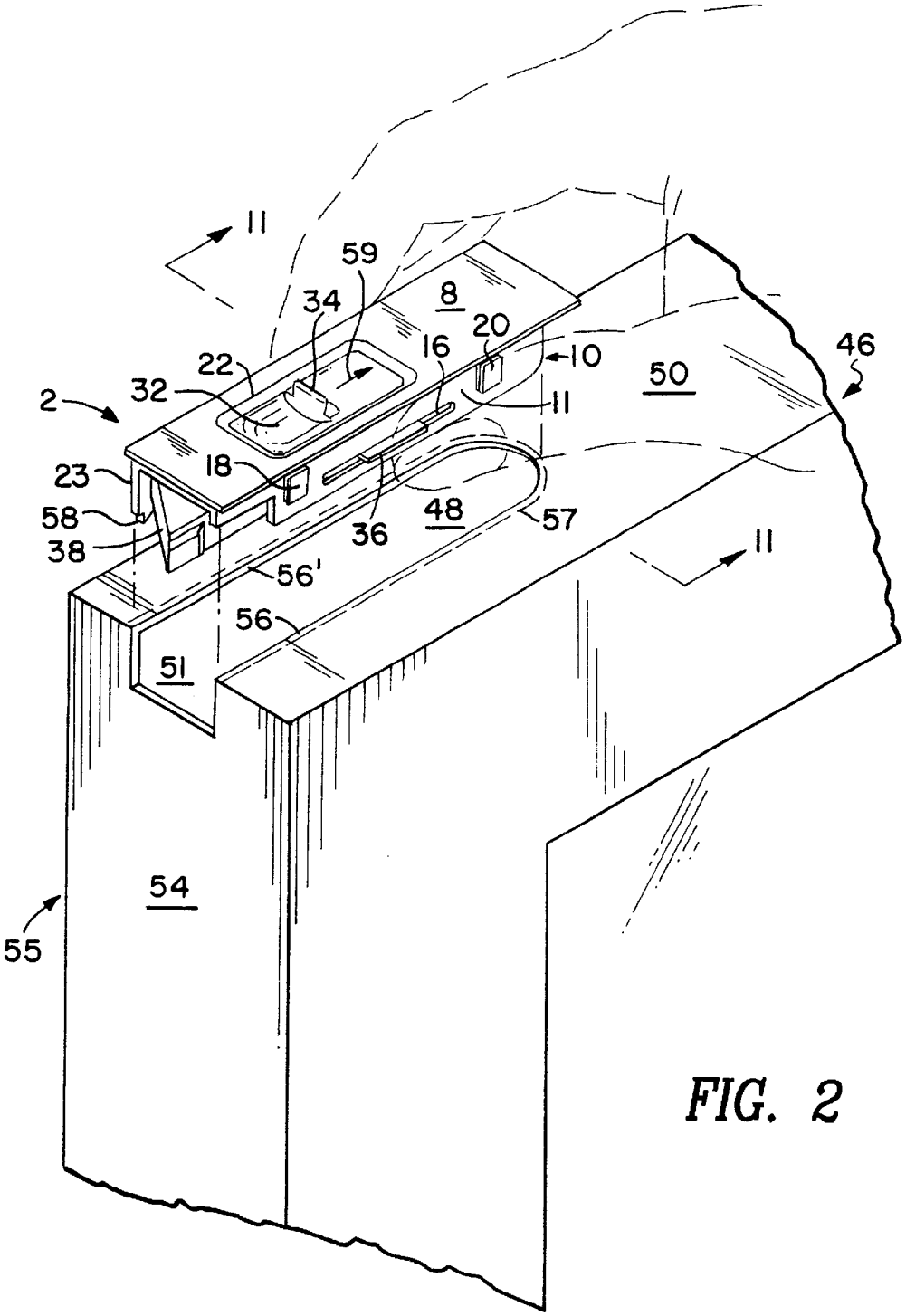
FIG. 2 illustrates how the latch mechanism of FIG. 1 is mounted in a window sash.
Figure 3:
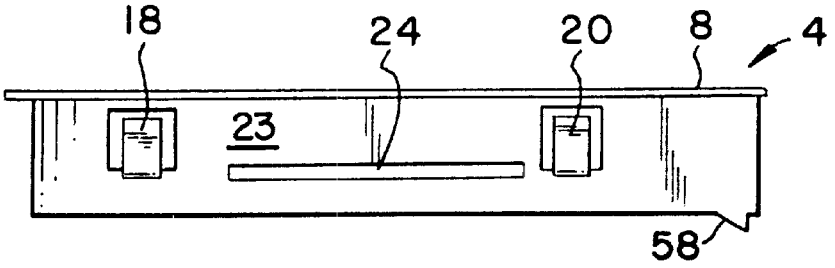
FIG. 3 is one side view of a housing of the latch mechanism.

Reference is made to FIG. 2 to show how the latch mechanism when assembled as just described is mounted in a hollow window sash 46. An elongated opening 48 in the top wall 50 of the sash communicates with an opening 51 in the outside wall 54 of a stile 55. The elongated opening 48 is preferably shaped so that the dependant wall 10 of the housing 2 can just pass through it and be in contact with its edges 56 and 56'. As the assembled mechanism is lowered, the tabs 18 and 20 as well as tabs 18' and 20' on the opposite wall 23 that are seen in FIG. 3 but not in FIG. 2 come in contact with the edges 56 and 56' respectively, and further lowering compresses them inwardly. With still further lowering, the tops of the tabs such as 18, 20 and 18', 20' are below the edges 56 and 56' respectively so that they snap outwardly under it. The dimensions are such that when this occurs, the under side of the top plate 8 will be in contact with the top wall 50 of the sash as indicated by a dashed line 57 so that the mechanism is tightly clamped into position by the resilient forces exerted by the tabs 18, 20 and 18', 20'.

When mounted in this way, the housing 2 is prevented from sliding out through the openings 51 by a projection 58, also shown in FIG. 3, that extends downwardly from the far wall 23 so as to be in contact with the inside of the wall 54 of the stile 55. Note that the wing 36 from the bolt 4 extends into the slot 16 of the housing 2. The well 32 and the knob 34 are exposed in the aperture 22 so that a user can move the bolt 4 with a finger in the direction of an arrow 59.

FIG. 3 is an outside view of the side wall 23 of the wall 10 of the housing 2 showing the slot 24 and tabs 18' and 20' that respectively correspond to the tabs 18 and 20 in the side wall 11 of the wall 10.

Figure 4:
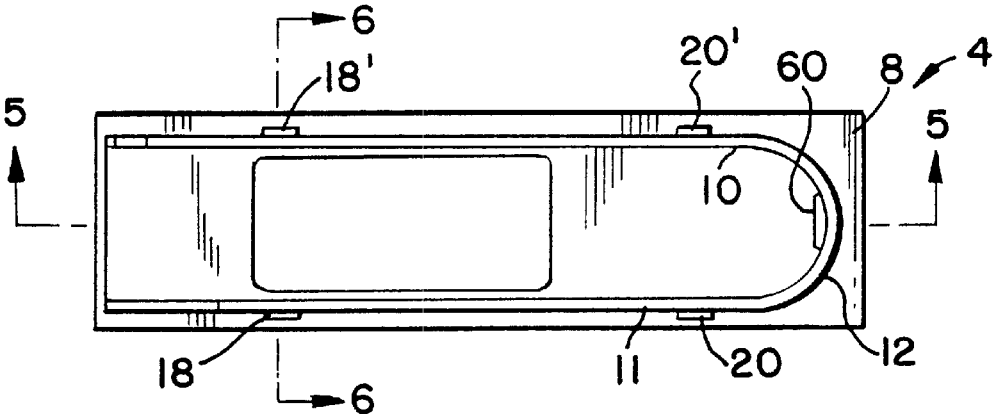
FIG. 4 is a bottom view of a housing of the latch mechanism.
Figure 5:
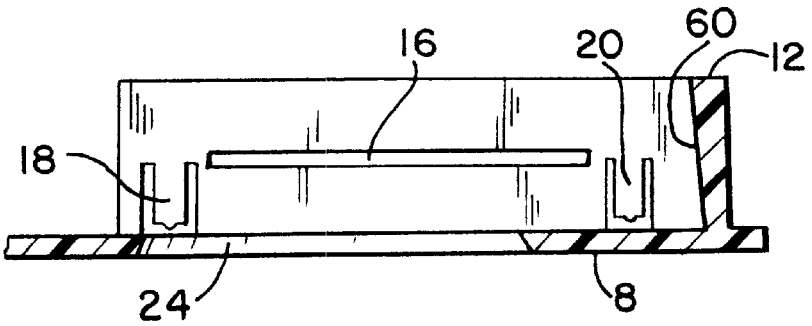
FIG. 5 is a longitudinal cross section 5,5 of the housing shown in FIG. 4.

FIG. 4 is a bottom view of the housing 4 in which there is a cup-like formation 60 in the end wall 12 for capturing one end of the spring 6, when the latch mechanism is assembled, to prevent the spring 6 from falling out. This is more clearly seen in FIG. 5 which is a cross section 5,5 of FIG. 4.

Figure 6:
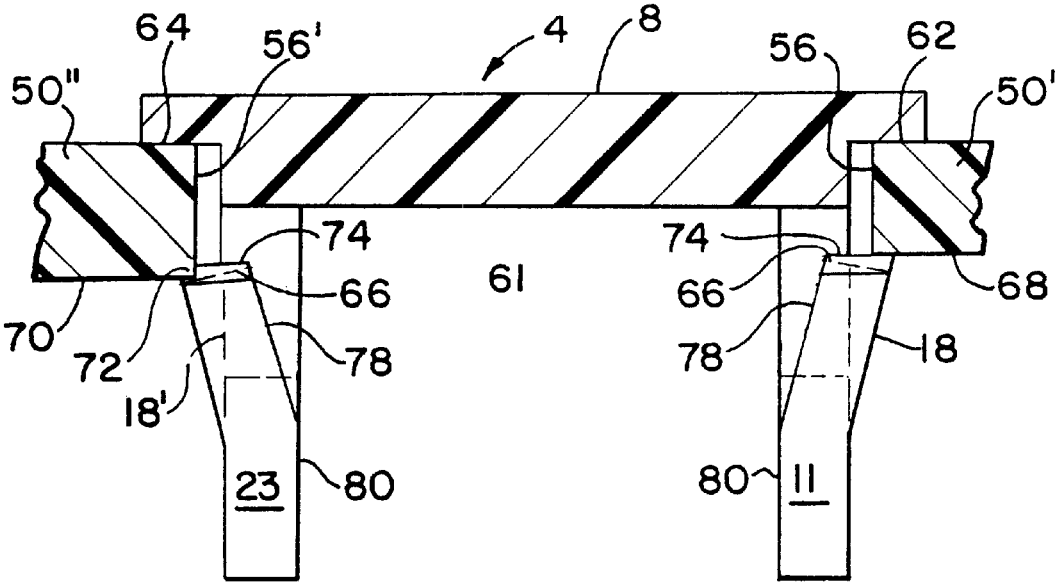
FIG. 6 is a transverse cross section 6,6 of the housing shown in FIG. 4 illustrating how it is clamped to the edge of an elongated opening in a sash.

FIG. 6 is a cross section 6,6 of FIG. 4 taken through the resilient tabs 18, 18' to explain the reasons why they provide a tight grip at the edges 56 and 56' of the opening 48 even through there are variations in the thickness of the material of the top wall 50 of the sash 46 in which the housing 2 is mounted. Although the top plate 8 could have the same thickness throughout, it is stronger if it is thicker in the central section 61 between the insides of the side walls 11 and 23 of the wall 10. Outwardly extending ledges 62 and 64 are formed by the top plate 8 and the walls 11 and 23 that will be in contact with the top wall 50 of the sash 46 when the latch mechanism is in operating position.

Figure 7:
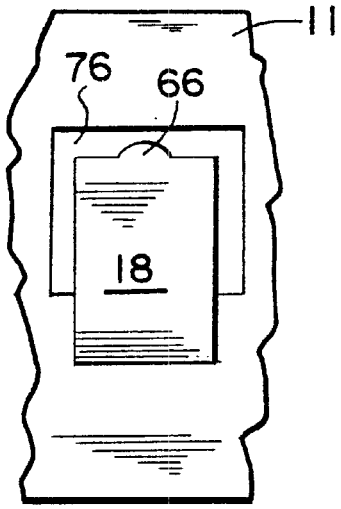
FIG. 7 is an outside view of one of the tabs shown in FIG. 6.

The tab 18 is shown as it and the other tabs 18', 20 and 20' would be positioned when the housing 4 is mounted for operation and gripping a thin top wall 50'. Although the top of the tab 18' could be perfectly flat, it is preferred for reasons to be explained that it have a raised portion such as a half cylinder 66 running perpendicularly with respect to the side walls 11 and 23 as shown in FIG. 7, which is an external view of a section of the side wall 23 within which the tab 18 is located. The external views of the other tabs 18', 20 and 20' would be the same. When the housing 4 is pushed down between the edges 56 and 56' of the elongated opening 48, all tabs 18, 18' and 20, 20' are forced inwardly, and when the tops of all the cylinders 66 drop below the bottom 68 of the thin sash wall 50', they spring outwardly into the position shown by the tab 18 of FIG. 6.

What occurs when the top wall 50 is thicker as indicated at 50" is shown by way of example in connection with the tab 18' in the side wall 23. The other tabs 18, 20 and 20' would be similarly positioned. When the top 8 of the housing 4 is in contact with the top wall 50", the top of the cylinder 66 will not be below the under surface 70 of the top wall 50", but the corner 72 of the top wall 50" will deform the cylinder 66. If there were no cylinder 66 and the top of the tab 18' came up to the top of the cylinder 66, the tab 18' would not be able to spring outwardly at all because the corner 72 could not deform the entire top of the tab 18'. A further improvement would be to taper the height of each the cylinders 66 as indicated by the dashed line 74.

Although not illustrate by a drawing, it can be seen that the fact that the tabs such as 18, 18', 20 and 20' are resilient also makes it possible for the housing 4 to be firmly positioned for wide variations in the distance between the edges 56 and 56' of the opening 48. Because they are resilient, they can extend farther out from the side walls 11 and 23 than they could if they were rigid and not prevent the insertion of the latch mechanism into the elongated opening 48.

The tabs 18, 18', 20 and 20' can be made resilient in a number of ways, but one way is illustrated in the FIG. 7 wherein a window 76 is formed behind the tab 18. Preferably, the window 76 is wider and taller than the tab.

Another important feature of the tabs 18 and 18' is that their inner surfaces 78 extend outwardly from the inner surfaces 80 of the walls 11 and 23 when they are in a normal position to prevent them from being inside the plane of the inside surfaces 80 when the housing 4 is in position for use. Thus, there is an obtuse angle of less than 180° between the surfaces 78 and 80. This prevents the tabs 18 and 18' from respectively touching the side walls 28 and 30 of the bolt 4 and impeding the ease with which it can be moved between latched and unlatched positions under circumstances where they can not spring outwardly to their original position as is the case of the tab 18' of FIG. 6. In this particular embodiment of the invention, this would only apply to the tabs 18 and 18' because they are respectively adjacent to the walls 28 and 30 of the bolt 4, but would not only apply to the tabs 20 and 20' because they are located in the area of the spring 6 so that they can not touch the walls 28 and 30.

Figure 8:
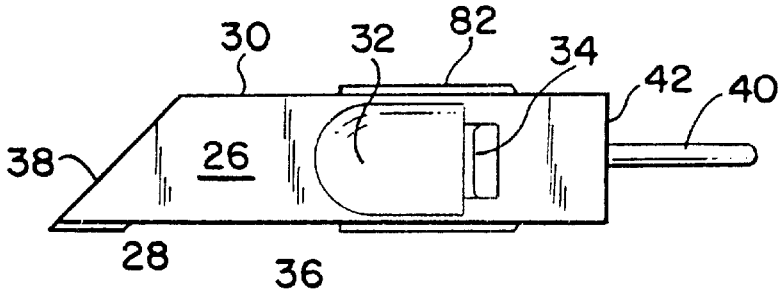
FIG. 8 is a top view of a bolt.
Figure 9:
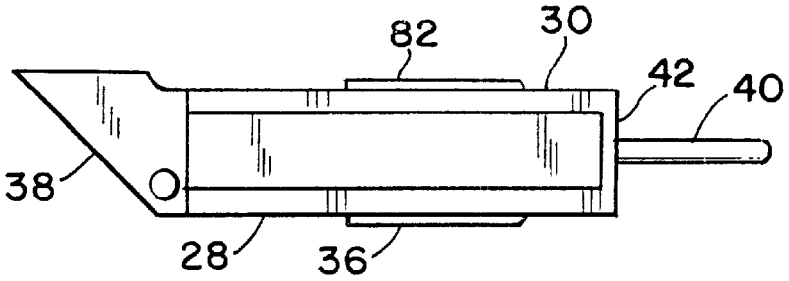
FIG. 9 is a bottom view of a bolt.

FIG. 8 is a top view of the bolt 4 showing for the first time a wing 82 extending from the wall 30, and FIG. 9 is a bottom view of the bolt 4 showing that there is no bottom connected between the walls 28 and 30.

Figure 10:
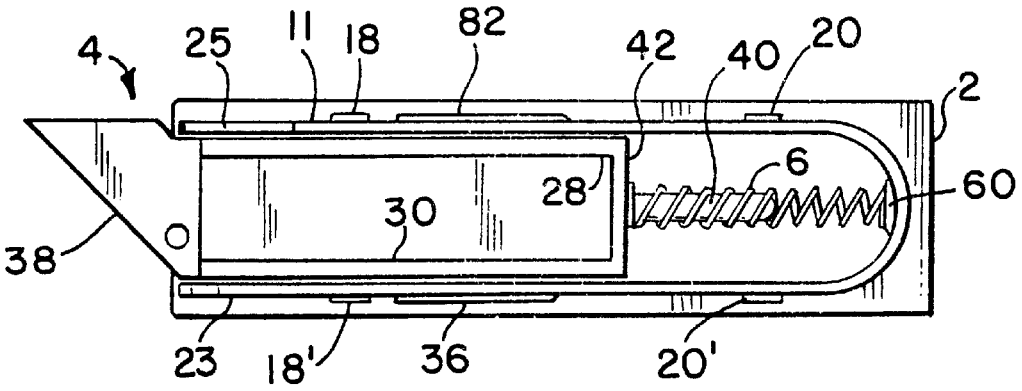
FIG. 10 is a bottom view of a bolt mounted in a housing in which a coiled spring is used.

FIG. 10 is a bottom view of an assembled latch mechanism in which the spring 6 is used to push the bolt 4 outwardly of the housing 2.

Figure 11:
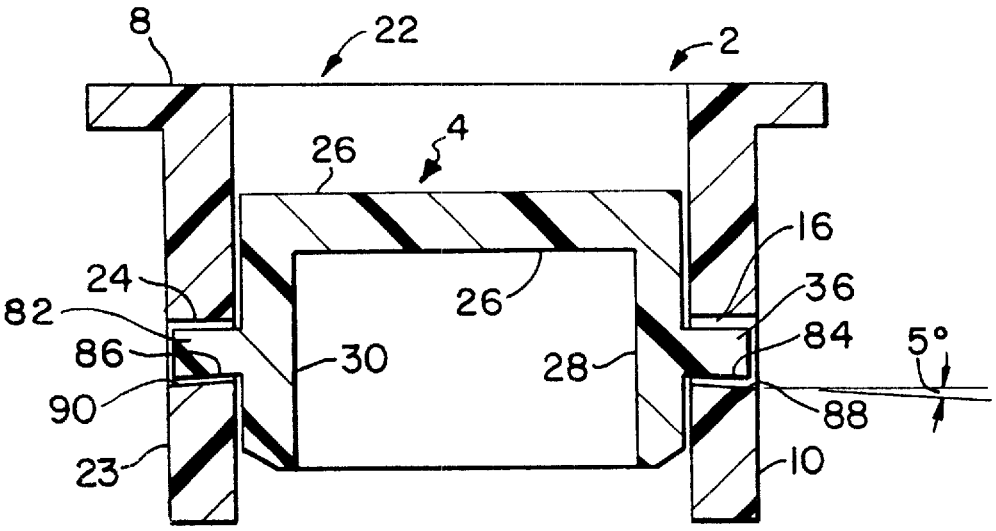
FIG. 11 is a transverse cross section 11,11 of the latch mechanism of FIG. 2 taken through the slots in the housing and the wings of the bolt therein.

FIG. 11 is a section 11, 11 of the assembled latch mechanism as shown in FIG. 2 showing the manner in which the bolt 4 fits in the housing 2. The wing 36 extending from the wall 28 and the wing 82 extending from the wall 30 of the bolt 4 respectively extend into the slots 16 and 24. In order to prevent force exerted on the bolt 4 via the aperture 22, as, for example, may occur when the bolt 4 is being operated, the lower surface 84 and 86 of the wings 36 and 24 and the lower surfaces 88 and 90 of the slots 16 and 24 slant away from the top 26 of the bolt 4 in proceeding from the inside to the outside at a slight angle such as the 5° shown so as to pull the walls 11 and 23 inward.

Figure 12:
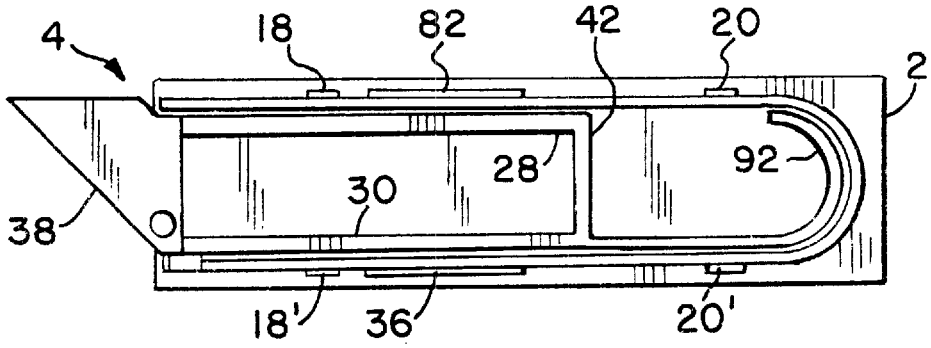
FIG. 12 is the bottom view of a bolt mounted in a housing showing the use of a C shaped, spring.
Figure 13:
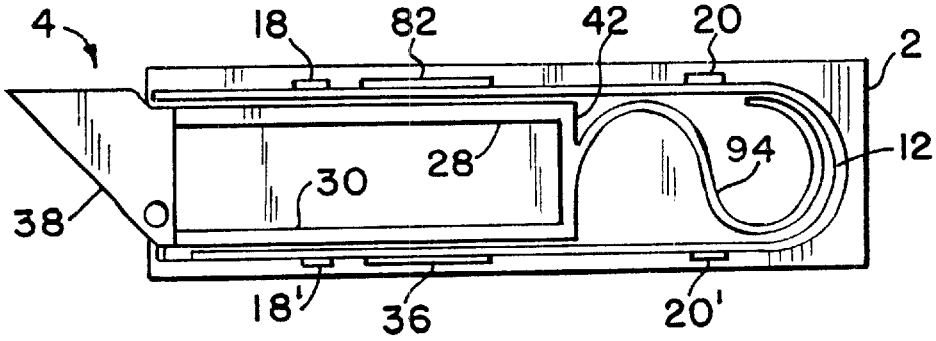
FIG. 13 is a bottom view of a bolt mounted in a housing showing the use of an S shaped spring.

Instead of using a coiled spring 6, a C shaped spring 92, as shown in FIG. 12, or an S shaped spring 94, as shown in FIG. 13, could be designed as an integral part of the bolt 4 so as to be inserted between the end wall 42 of the bolt 4 and the end wall 12 of the housing 2. In either case the post 40 and spring 6 would be omitted.

In order to avoid confusion, only a latch mechanism of the invention for the left side of a window when viewed from the inside is shown, but it is thought that one skilled in the art would have no difficulty in understanding what a latch mechanism for the right side of the window would look like.

What is claimed is:

[1. A latch mechanism comprising:

an housing having a top plate with an outer edge;

side walls depending from said top plate;

said side walls having outer surfaces joining said top plate at a distance from its edge so as to form a ledge between each outer surface and said edge of said top plate;

a slot in each side wall;

an end wall depending from said sop plate that is transverse to said side walls;

flexible tabs extending outwardly from the outer surface of each side wall and toward said top plate, said tabs having an inner side surface;

a bolt having first and second ends and wings on opposite sides such that when said bolt is between said side walls of said housing, each wing passes through a slot in a side wall;

said wings being shorter than said slots so as to permit said bolt to be slid longitudinally within said housing; and a spring located between the first end of said bolt and said end wall of said housing.]

[2. A latch mechanism as set forth in claim 1 further comprising:

a post extending from said first end of said bolt; and said spring being a coiled compression spring having one end wrapped around said post and the other end adjacent the end wall of said housing.]

[3. A latch mechanism as set forth in claim 2 further comprising:

cup shaped means at the inside of said end wall of said housing for capturing the other end of the spring.]

[4. A latch mechanism as set forth in claim 3 wherein said means for capturing the other end of said spring is a thickening of the end wall of said housing.]

[5. A latch mechanism as set forth in claim 1 wherein the inner surface of a flexible tab facing the opposite side wall extends outwardly from the inner surface of the side wall in which it is located sufficiently to prevent its being inside the plane of the inner surface of the side wall when the latch mechanism is installed in a sash.]

[6. A latch mechanism as set forth in claim 1 wherein:

each of said wings extending from said bolt is comprised of a ridge parallel to said top plate, said ridge having a first surface on the side of said ridge that is nearer said top plate and a second surface that is remote from said top plate, the second surface being closer to said top plate at the bolt than it is at a point remote from the bolt; whereby the said ridges draw the sidewalls of said housing inwardly when force is applied in a direction through said aperture in said top plate and toward said bolt.]

[7. A latch mechanism as set forth in claim 1 further comprising:

a projection from one of said side walls extending in a direction away from said top plate.]

[8. A latch mechanism as set forth in claim 1 further comprising:

a member made of veneer adhered to said top plate; and an aperture in said member in registration with said aperture in said top plate.]

[9. A latch mechanism as set forth in claim 1, wherein said spring and bolt are an integral unit said spring having a C shape.]

[10. A latch mechanism as set forth in claim 1, wherein said spring and said bolt are fabricated from a single piece of material said spring having an S shape.]

*11. A latch mechanism comprising:*

*a housing having a top plate with an outer edge, the housing further having a pair of side walls depending from said top plate, said side walls having outer surfaces joining said top plate at a distance from its edge so as to form a ledge between each outer surface and said edge of said top plate;*

*a slot in each side all, said slot extending generally parallel to the outer edge of the top plate;*

*a resilient tab extending outwardly from the outer surface of each side wall and toward said top plate wherein a space is maintained between the tab and the top plate, a window being provided behind the tab that is wider and taller than the tab;*

*the top plate and tab adapted to cooperate to receive a latch support member in the space; and*

*a bolt disposed within the housing, said bolt being slidable along an axis generally parallel to said top plate, the bolt further having wings on opposite sides such that when said bolt is disposed between said side walls of said housing, each wing passes through one of said respective slots in said side walls said wings being shorter than said slots so as to permit said bolt to be slid longitudinally within said housing.*

*12. A latch mechanism for a sash window disposed within opposed jambs, the sash window comprising a top sash member, bottoms sash member and two stiles connected together at their extremities, the latch mechanism adapted for releasably securing the sash window to the jambs, the latch mechanism comprising:*

*a housing having a top plate with an outer edge, the housing further having a pair of side walls depending from said top plate, each of said side walls having an outer surface joining said top plate at a distance from its edge so as to form a ledge between each outer surface and said edge of said top plate;*

*a slot in each side wall, said slot extending generally parallel to the outer edge of the top plate;*

*a resilient tab extending outwardly from the outer surface of each side wall and toward said top plate; and*

*a bolt disposed within the housing and having an end adapted for engaging a respective one of the jambs, said bolt being slidable along an axis generally parallel to said top plate, the bolt further having wings on opposite sides such that when said bolt is disposed between said side walls of said housing, each wing passes through one of said respective slots in said side walls said wings being shorter than said slots so as to permit said bolt to be slid longitudinally within said housing.*

*13. The latch mechanism of claim 12 wherein the resilient tab comprises a pair of resilient tabs on each side wall.*

*14. The latch mechanism of claim 12 wherein each side wall has a resilient tab towards substantially a front portion of the side walls and a resilient tab towards substantially a rear of the side wall.*

*15. The latch mechanism of claim 12 wherein each resilient tab has a cylinder projecting towards the top plate.*

*16. The latch mechanism of claim 13 wherein the cylinder is tapered.*

*17. The latch mechanism of claim 12 further comprising means for biasing the bolt through an end opening in the housing.*

*18. A latch mechanism comprising:*

*a housing having a top plate with an outer edge;*

*side walls depending from said top plate;*

*said side walls having outer surfaces joining said top plate at a distance from its edge so as to form a ledge between each outer surface and said edge of said top plate;*

*a slot in each side wall;*

*flexible tabs extending outwardly from the outer surface of each side wall and toward said top plate, said tabs having an inner side surface;*

*a bolt having first and second ends and wings on opposite sides such that when said bolt is between said side walls of said housing, each wing passes through a slot in a side wall; and*

*said wings being shorter than said slots so as to permit said bolt to be slid longitudinally within said housing.*

* * * * *